(12) United States Patent
Stretton et al.

(10) Patent No.: US 9,701,412 B2
(45) Date of Patent: Jul. 11, 2017

(54) AIRCRAFT ENGINE MOUNT

(71) Applicant: ROLLS-ROYCE PLC, London (GB)

(72) Inventors: Richard Geoffrey Stretton, Ashby-de-la-Zouch (GB); Kenneth Franklin Udall, Derby (GB)

(73) Assignee: ROLLS-ROYCE plc, London (GB)

( * ) Notice: Subject to any disclaimer, the term of this patent is extended or adjusted under 35 U.S.C. 154(b) by 339 days.

(21) Appl. No.: 14/474,760

(22) Filed: Sep. 2, 2014

(65) Prior Publication Data

US 2015/0069176 A1 Mar. 12, 2015

(30) Foreign Application Priority Data

Sep. 9, 2013 (GB) .................................... 1315968.6

(51) Int. Cl.
  B64D 27/00 (2006.01)
  B64D 27/26 (2006.01)

(52) U.S. Cl.
  CPC ........ *B64D 27/26* (2013.01); *B64D 2027/262* (2013.01); *B64D 2027/266* (2013.01)

(58) Field of Classification Search
  CPC ........ B64D 2027/262; B64D 2027/266; B64D 27/26
  See application file for complete search history.

(56) References Cited

U.S. PATENT DOCUMENTS

| | | | |
|---|---|---|---|
| 5,078,342 A | 1/1992 | Langley et al. | |
| 5,275,357 A * | 1/1994 | Seelen | B64D 27/26 244/54 |
| 5,351,930 A * | 10/1994 | Gwinn | B64D 27/26 244/54 |

(Continued)

FOREIGN PATENT DOCUMENTS

| | | |
|---|---|---|
| EP | 1 281 615 A1 | 2/2003 |
| EP | 1852346 A1 | 11/2007 |

(Continued)

OTHER PUBLICATIONS

Mar. 25, 2014 Search Report issued in British Application No. GB1315968.6.

(Continued)

*Primary Examiner* — Brian M O'Hara
*Assistant Examiner* — Assres H Woldemaryam
(74) *Attorney, Agent, or Firm* — Oliff PLC (57) ABSTRACT

An engine mount, for mounting the casing of an aircraft engine to the fuselage or wing of an aircraft, e.g. via a pylon, including first and second links having connector formations for connection to respective mounting and support formations on the engine casing and aircraft mounting structure. Each of the first and second links is typically connected by a pin between the mounting and support formations. Each link has a further connector formation arranged such that the connector formation of the first link is offset from the connector formation of the second link. The connector formations are joined by an intermediate link. The mount allows lateral forces and torque to be resolved in such a way as to substantially avoid lateral displacement of the engine away from a central plane. The intermediate link may also provide a failsafe catcher arrangement in the event that the first or second link fail.

18 Claims, 5 Drawing Sheets

(56) References Cited

U.S. PATENT DOCUMENTS

| | | | | |
|---|---|---|---|---|
| 5,860,623 A * | 1/1999 | Dunstan | ............. | B64D 27/18 244/54 |
| 6,059,227 A | 5/2000 | Le Blaye et al. | | |
| 6,330,995 B1 * | 12/2001 | Mangeiga | ............. | B64D 27/26 244/54 |
| 6,341,746 B1 * | 1/2002 | Pascal | ............. | B64D 27/26 244/54 |
| 6,648,271 B2 * | 11/2003 | Levert | ............. | B64D 27/26 244/54 |
| 8,328,133 B2 * | 12/2012 | Suciu | ............. | B64D 27/26 244/54 |
| 8,443,612 B2 * | 5/2013 | Foster | ............. | B64D 27/26 244/54 |
| 9,180,975 B2 * | 11/2015 | Brochard | ............. | B64D 27/26 |
| 2002/0104924 A1 * | 8/2002 | Roszak | ............. | B64D 27/26 244/54 |
| 2006/0219841 A1 * | 10/2006 | Dron | ............. | B64D 27/26 244/54 |
| 2007/0138337 A1 * | 6/2007 | Audart-Noel | ............. | B64D 27/26 244/53 R |
| 2008/0073460 A1 * | 3/2008 | Beardsley | ............. | B64D 27/26 244/54 |
| 2008/0230675 A1 * | 9/2008 | Audart-Noel | ............. | B64D 27/26 248/554 |
| 2012/0198816 A1 | 8/2012 | Suciu et al. | | |
| 2014/0061426 A1 * | 3/2014 | Zheng | ............. | B64D 27/26 248/554 |

FOREIGN PATENT DOCUMENTS

| | | | | |
|---|---|---|---|---|
| EP | 2 133 268 A2 | 12/2009 | | |
| EP | 2 221 249 A2 | 8/2010 | | |
| FR | 2925016 B1 * | 6/2010 | ............. | B64D 27/26 |
| GB | 2 224 707 A | 5/1990 | | |
| WO | WO 2011159671 A1 * | 12/2011 | ............. | B64D 27/26 |

OTHER PUBLICATIONS

Jan. 22, 2015 Search Report issued in European Application No. 14183050.

* cited by examiner

AIRCRAFT ENGINE MOUNT

BACKGROUND OF THE INVENTION

This invention relates to an aircraft engine mount and more specifically, although not exclusively, to an arrangement for mounting a gas turbine engine to an aircraft pylon.

A conventional mounting arrangement allows a gas turbine engine to be hung beneath an aircraft wing or else mounted to the fuselage.

It is a consideration in the design of aircraft engine pylons, that the pylon is not only capable of supporting the engine but also withstanding the multidirectional loads experienced by the engine in use and bearing the thrust and reverse thrust produced by the engine. It is an aim to maintain the engine alignment relative to the wing or fuselage so as to avoid off axis loading. However this aim is hampered by thermal expansion of the engine that can occur in use. Thermal expansion is transient and may occur in a localised region or regions of the engine casing rather than in a uniform manner.

Known engine mounts include "two-link" and "three-link" arrangements. An example of a two-link arrangement is shown in US2008/0230675A1. This comprises a mounting block to which two link arms are connected. The link arms generally have the form of triangular members that are each pinned at two apexes to the mounting block. The free apex is pinned to the engine casing. Multiple link attachment points allow the mounting structure to retain torque capability even under failure case scenarios. This arrangement has the disadvantage that, if localised thermal expansion of the engine occurs, the casing may be displaced laterally and downwardly relative to one of the links, causing misalignment with other assemblies such as the nacelle exhaust system.

An example of a three-link arrangement is shown in U.S. Pat. No. 5,078,342A. In this arrangement the link arms are straight and are pinned to the mounting block at one end and to the engine casing at the other. A third straight link arm, for reacting torque loads, is pinned to the casing at its centre-line and to the mounting block at a location spaced from the casing centre-line. The presence of the third link arm may mitigate the lateral/downward displacement caused by localised thermal expansion. However, it can be difficult to accommodate the third link arm, particularly in arrangements in which space between the casing and the mounting block is limited.

The present invention overcomes or substantially mitigates some or all of the above-mentioned and/or other disadvantages of the prior art.

BRIEF SUMMARY OF THE INVENTION

According to a first aspect of the invention there is provided an engine mounting assembly, for securing an aircraft engine to an aircraft, the assembly comprising: first and second spaced support formations on the engine; first and second corresponding mounting formations on a mounting structure of the aircraft; and first and second links, the first link extending between the first support formation and the first mounting formation, and the second link extending between the second support formation and the second mounting formation, the first and second links being shaped to depend inwardly from the first and second mounting formations towards respective first and second connection formations, wherein the first and second connection formations are offset and connected by an intermediate link.

The first and second connection formations may be offset in that they may be spaced from the engine or the respective engine support formations by different distances. The engine may have a centre of gravity or central axis, which may comprise a longitudinal axis. The first and second connection formations may be offset in that they may be located at different radial distances from said centre of gravity or central axis. The first and second connection formations may be located at different heights.

The inwardly depending portions of the first and second links may take the form of levers. The inwardly depending portions of the first and second links may be vertically offset, for example in that they may be spaced from the engine by different distances. The pairing or coupling of the intermediate link between the first and second links in the manner claimed is advantageous in that it may provide a further force path and avoid a local offset couple in the engine mounting assembly between the lever portions of the first and second links.

The first and second connection formations may be provided on the respective first and second links.

At least a portion of the first and second links may extend generally inwardly from the mounting and/or support formations towards a central or vertical plane there-between.

The offset arrangement of the first and second connection formations is beneficial in that a load experienced by only one of the links due to local thermal expansion/loading, e.g. in the vicinity of one engine support formation, will be communicated to the other link by the intermediate member in a manner that reacts said loading so as to withstand any resultant roll torque being applied to the engine. Loads applied to one link only, e.g. along a link axis will pass directly into the mounting formation in a substantially vertical direction with minimal loading on the remainder of the system.

A vertical direction or plane may be defined as a plane that includes the engine axis and passes between the first and second mounting and/or support formations.

The mounting structure of the aircraft may be, or comprise, a pylon.

The support structure of the engine may comprise an engine casing. The support structure may comprise a rear engine casing structure.

The mounting formations may comprise mount pad lugs. The support formations may comprise casing lugs.

The first and second mounting formations may be located to each side of the engine axis and may be substantially equally spaced therefrom. The first and second support formations may be located to each side of the engine axis and may be substantially equally spaced therefrom. The spacing of the support formations (e.g. lateral spacing) may, or may not, be greater than that of the mounting formations.

The support formations may be angularly spaced relative to the engine axis. The support formations may be spaced about and/or depend from an engine casing structure.

The first and/or second links may have a mounting formation connector. The first and/or second links may have a support formation connector. The first and/or second links may extend in a first direction between the support connector and the mounting connector. The first and/or second link may extend in a second direction between the mounting connector and its connection formation (e.g. towards the intermediate link in use). The angle between the first and second directions may be an obtuse angle, for example between 90° and 140°. The first direction may be approximately tangential to the engine casing. Alternatively, the angle between the first and second directions could be acute, for example such that the first direction is approximately radial to the engine casing.

The first and/or second link may comprise an elbow. The first and/or second link may be generally triangular or delta-shaped. The first and/or second link may be arched and/or may have one or more rounded apex. The first and/or second link may be generally boomerang-shaped.

The first and/or second links may be attached to any or any combination of the support formations, mounting formations and/or intermediate link by a pivoting connection. The pivoting connection may serve as a fulcrum. The first and/or second links may be attached to any or any combination of the support formations, mounting formations and/or intermediate link by a pin, e.g. thereby forming a pin joint. Any or any combination of the links, support formations or mounting formations may comprise one or more aperture arranged to receive a pin. The one or more aperture may open or extend in a direction that is parallel to the engine axis. The one or more aperture may be a through bore in the respective link. The apertures may be circular.

The apertures of the mounting formation connector and/or support formation connector of the first and/or second links may be a close tolerance fit with the pin passing therethrough.

The entire mount may be a pin jointed structure (i.e. all connections between the links and the engine/pylon may be pin joints). Any, any combination, or all of the joints may be pinned ball joints.

A mounting arrangement according to the invention can better react loads on the engine casing, such as side, vertical and/or torsional loads and can accommodate deflection resulting from local and global thermal expansion in the engine. For example, if the rear engine casing structure expands due to the hot exhaust gas, the casing rear casing structure will expand uniformly, displacing the engine mounting formations radially outwards. If this occurs in the vicinity of the first support formation, the first link may be urged to in a clockwise sense about its mounting formation. The offset arrangement of the first and second links relative to the intermediate link urges the second link anticlockwise about its mounting formation, thereby accommodating a corresponding displacement to the second support formation. This minimises, and may eliminate, lateral displacement of the casing due to thermal expansion of the structure and supporting links. The link geometry could also be optimised so that the radial growth in the vertical sense is partially offset by the articulation of the supporting links, thereby keeping the engine centre line at a constant position. Furthermore, if the engine experiences, for example, a clockwise torsional load, both the first and second links are urged to pivot in the same sense. This results in the loading on the first and second links counterbalancing at the intermediate member so as to cause tension in the paired intermediate links to balance the torsional load.

The first and/or second links may have first and second load transfer portions. The first portion may extend between the support connector and the mounting connector. The second load transfer portion may extend between the mounting connector and the connection formation. The first and/or second load transfer portion may be generally elongate and may have the form of an arm. The first load transfer portions of the first and second links may subtend a substantially equal, but typically opposite, angle with a vertical axis in use. The second load transfer portions of the first and second links may be substantially parallel.

A portion of the first link may extend beneath the second link or vice versa. That portion may comprise the connection formation and may comprise the second load transfer portion.

The first and second connection formations may be arranged in a linear alignment with the engine axis. The first and second connection formations and engine axis may be substantially vertically aligned. The intermediate link may be vertically aligned.

The intermediate link may be paired with the first and second links. The intermediate link may extend between (e.g. being paired with) the aircraft mounting structure and the engine support structure. The intermediate link may be attached between the mounting and support structures, for example by pin joints. The intermediate link may be coupled between the first link and mounting structure at one end thereof and the second link and casing structure at its other end. The intermediate link may comprise a plurality of intermediate link members, which may be commonly connected at respective joints, such as in the form of a paired link.

A connection between the intermediate link and the aircraft mounting structure and/or the engine support structure may be arranged (e.g. by use of a clearance aperture) such that the intermediate link is not weight bearing for the engine in normal use. The connection may be arranged to be weight bearing for the engine in the event of a failure in the mounting assembly, for example a failure of the first or second link.

An intermediate mounting formation and/or support formation may be provided between the first and second mounting and/or support formations. The intermediate link may be attached between the intermediate mounting and support formations. The first connection formation of the first link may be connected to one of the intermediate mounting formation and the support formation. The second connection formation of the second link may be connected to the other of the intermediate mounting formation and the support formation.

The intermediate link may be connected to both the first link and the intermediate mounting formation by a common pin. The intermediate link may be connected to both the second link and the support formation by a common pin. The intermediate link may be connected at its opposing ends to said common pin joints. One or both common pin joints may be aligned with a longitudinal plane of the engine and/or engine casing.

The intermediate mounting formation and/or support formation may have an aperture to receive a pin, wherein the aperture may be sized to allow a clearance about said pin. The pin may be loosely supported thereby, for example when compared to a tolerance between the respective pin and the corresponding aperture of the mounting formation connector and/or support formation connector.

The connection of the intermediate link between the engine and pylon is beneficial in that the link provides a fail-safe 'catcher' arrangement that can support the engine in the event that one of the primary structural elements (such as one of the first or second links, a pin, a mounting formation or a support formation) fails in use. The intermediate link and one remaining link can also maintain the advantageous reaction of side, vertical and/or roll torque as described above.

The intermediate link may be angled relative to the adjacent portion of the connected first or second link, e.g. the second load transfer portion, by between 45° and 90°. The angle may be between 70° or 80° and 90°.

The intermediate link may extend towards the engine axis, for example in a substantially radial direction. The intermediate link may be substantially aligned with a central engine axis. The intermediate link may be substantially vertically aligned.

The first and second connection formations (or the associate link pins) may be offset from one another in the vertical direction. The first and/or second connection formations may be located at an end of the first and/or second links. The end of the first link may be connected to the end of the second link by the intermediate link. The first and second links may depend outwardly from the intermediate link in opposing directions.

The first and/or second links may be plate-like in form and may have a uniform thickness. The front and rear surfaces of the first and/or second links may be generally flat.

The aircraft mounting structure may comprise a mounting pad and/or mounting block. The mounting block may comprise a connecting/mounting pad with fixings, such as tension bolts and shear pins. The mounting block may comprise a connecting recess for connecting the mounting block to the fuselage or wing, e.g. via a pylon. The mounting block may be adapted such that, in use, the connecting pad and/or recess extends in a direction parallel to the major axis of the engine casing. The recess and/or pad may be generally trapezoidal or rectangular in cross-section. The pad may have one or more formations for receiving tension bolts and/or shear pins for transferring loads in use. The first and/or second links may be connected to the mounting block via one or more lugs. The lugs may depend downwardly from the mounting block, typically from an underside of the mounting block.

Any or any combination of the mounting or support formations described above may comprise projections depending from the respective mounting or support structure. The formations may take the form of lugs, such as lobed projections. Each formation may comprise a pair of projections, which may be spaced so as to receive the corresponding link therebetween. A common pin may run through the pair of projections and link so as to define a pin joint, such as for example a pinned ball joint.

According to a second aspect of the invention there is provided an engine mounting assembly, for securing an aircraft engine to an aircraft, the assembly comprising: first and second spaced support formations on the engine; first and second corresponding mounting formations on a mounting structure of the aircraft; and first and second links, the first link extending between the first support formation and the first mounting formation, and the second link extending between the second support formation and the second mounting formation, the first and second links having respective first and second connection formations and the first and second links being shaped to depend towards a region between the first and second mounting formations, towards the respective first and second connection formations, wherein the first and second connection formations are offset and connected by an intermediate link.

The skilled person will appreciate that a feature described in relation to the first aspect of the invention may be applied mutatis mutandis to the second aspect.

According to a third aspect of the invention, there is provided a link assembly comprising first, second and intermediate links for use in the first or second aspect of the invention.

BRIEF DESCRIPTION OF THE DRAWINGS

Practicable embodiments of the invention will now be described, for illustration only, with reference to the accompanying drawings, in which.

DETAILED DESCRIPTION OF THE INVENTION

Figure 7:
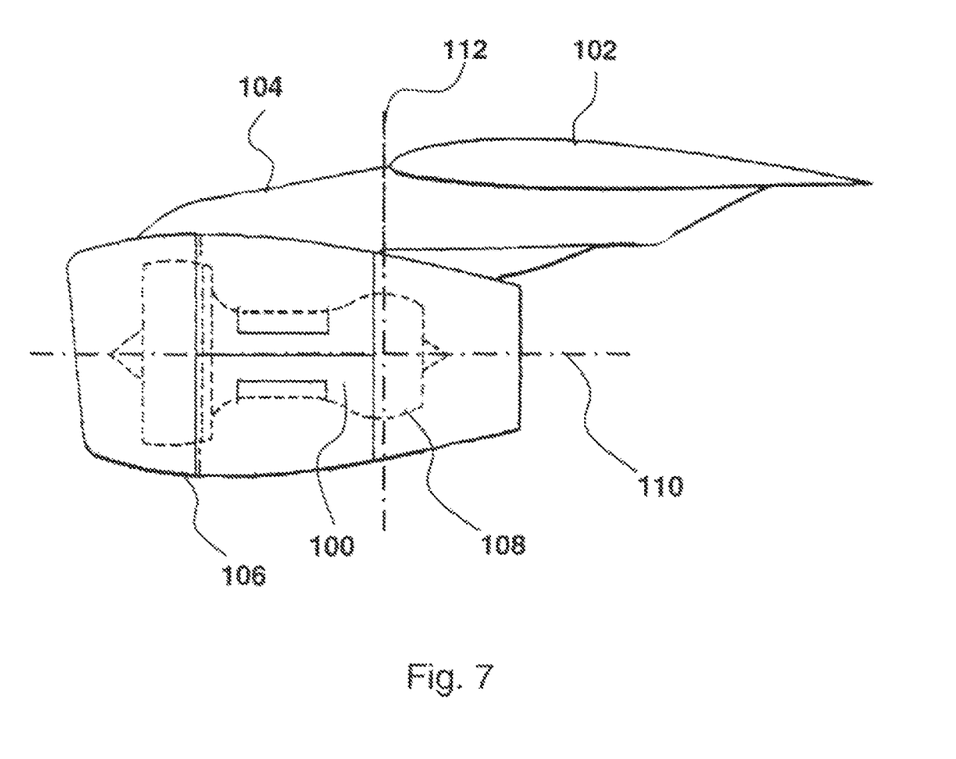

The arrangement according to the invention, indicated as 1 in FIGS. 1-4, comprises a mount for supporting an engine casing on the wing or the fuselage of an aircraft. In FIG. 7, there is shown an example of a gas turbine engine 100 mounted beneath an aircraft wing 102 by a pylon 104. The engine is housed within a nacelle 106 and operates in a conventional manner that will not be described herein for conciseness. The core engine 100 is contained within a casing 108, to a rear portion of which the pylon 104 is attached by a mounting arrangement as will be described below with reference to a longitudinal or principle engine axis 110 and a cross-sectional plane or direction 112, which is perpendicular to the axis 110. The plane 112 in this example represents the rear mount plane for the engine. As will be understood by the skilled person, the rotating parts of the engine, such as the fan, compressor(s) and turbines (not shown) typically rotate about axis 110.

A central or longitudinal plane, referred to as a centre line in a cross-sectional view, may also be defined as a vertical plane containing axis 110.

The embodiment shown in the figures includes a mounting arrangement 2, comprising an aircraft mount pad 2A and an engine mount pad 2B mounted to the aircraft mount pad 2A. The engine mount pad 2B comprises an engine mounting formation 3, to which is mounted an assembly in accordance with the invention. The assembly briefly comprises the mounting formation 3, linking members 4, 5 and support formations in the form of connecting lugs 6, 7, 8. The lugs 6, 7, 8 are mounted on an upper surface of the engine casing. The engine mount pad 2B connects to the lugs 6, 7, 8 mounted on the casing via the links 4, 5.

The aircraft mount pad 2A is attached to the pylon and has a generally cuboidal structure with a horizontally-extending connecting recess 20 for connection to the wing/fuselage. The structure of the aircraft mount pad 2A, as well as the way it connects to the wing/fuselage, is known in the art and will not be described in detail here. An underside of the engine mount pad 2B has a downwardly-facing surface, which may be generally flat and of a rectangular profile. The mounting formation 3 depends downwardly from the underside of the engine mount pad 2B.

The mounting formation 3 takes the form of a connector, shaped so as to define a pair of mount pad lugs 3A and 3B, which may be described as brackets, lobes, or equivalent connector formations. In this embodiment, the mounting formation 3 comprises front and rear walls, each identical in form. The walls each lie in a cross-sectional plane of the casing and define the mount pad lugs for receiving links 4, 5 in use. The walls are spaced apart in the direction of the principle axis 110 of the casing so as to define a component-receiving groove 9 therebetween. The walls extend along the full width of the aircraft mount pad 2A and have flat front and rear surfaces.

Each wall of the mounting formation 3 has a generally trapezoidal profile, and is orientated such that the width of the wall increases from top to bottom. The two lowermost apexes of the wall have a rounded profile in the axial plane. The lower edge of the wall has a curved depression extending between the spaced lugs 3A and 3B at opposing ends of the mounting formation 3. The depression is doubly curved so as to form a cusp or raised region at the centre of the depression extending towards the engine.

As a result of the rounded chamfer on the apexes and the central depression on the lower edge, the lugs 3A and 3B formed at lower apexes of the mounting formation 3 generally take the form of lobed lower projections for receiving links 4, 5. The mounting formation 3 is provided with two connecting apertures 10, 11, each located in a respective lug 3A, 3B. Each connecting aperture 10, 11 comprises a bore of circular cross-section extending fully through both front and rear walls in the region of each lug. Each connecting aperture 10, 11 is located generally in the centre of the lug.

The mounting formation 3 is provided with a third, or intermediate, aperture 12, extending fully through both front and rear walls in a central region of each wall. The aperture 12 is aligned with the central plane of the engine in this embodiment.

The apertures 10, 11, 12 provide formations by which the links 4, 5 can be mounted to the pylon as will be described below.

The engine-casing-mounted support formations comprise a left lug 7, a right lug 8 and a centre lug 6. Whilst herein referred to as engine casing lugs 6, 7 and 8, such support formations could otherwise be referred to as brackets, projections, lobes or other equivalent connecting formation. Each is located on the generally upwardly facing surface of the casing and is angularly spaced from the adjacent lug with respect to the principle engine axis. In particular, lug 6 is located on the centre line of the casing and lugs 7 and 8 are located one either side of the centre line, each being offset from the centre line by between approximately 5-20 degrees. The left 7 and right 8 lugs are identical in structure. Each comprises front and rear walls.

The front and rear walls each lie in a cross-sectional plane and are spaced in the direction of the principle engine axis so as to define a component-receiving groove therebetween. The walls of the brackets may be aligned in the same planes as the corresponding walls of the mounting formation 3.

Each wall has flat front and rear surfaces. The walls each have inclined sides that meet at a central apex, such that each wall has a generally triangular or lobed profile. The apex has a rounded chamfer and the inclined sides of the walls slope away therefrom towards the casing surface.

A connecting aperture, comprising a bore of circular cross-section, extends fully through the front and rear walls of the casing lugs, in the region of the upper apex. The connecting apertures of the lugs 7, 8 are spaced apart laterally to a greater extent than the spacing between the apertures 10 and 11 in the mounting formation lobes. However in other embodiments, the lug apertures could be spaced to a lesser extent, such as in the example of generally radially extending main mounting links.

The centre lug 6 is located between the left 7 and right 8 lugs. The centre lug 6 comprises front and rear walls that are plate-like in form and lie in the cross-sectional plane of the casing. The front and rear walls are spaced apart in the direction of the principle axis of the engine so as to define a component-receiving groove therebetween. Each wall has flat front and rear surfaces. The walls each have inclined sides that meet at a central apex, such that each wall has a generally triangular profile in the axial plane. The angle subtended by the inclined sides of the front and rear walls may be approximately 90 degrees. The upper apex has a rounded profile in the axial plane. The inclined sides of the walls are generally straight. A connecting aperture, comprising a bore of circular cross-section, extends fully through the front and rear walls, in the region of the apex.

The links 4, 5 are generally similar in structure but not identical in shape. The links are shaped to serve not only a weight-bearing link for the engine but also as a lever for use in accordance with the present invention. The links may thus be referred to as levers or lever-links.

Each link 4, 5 is generally plate-like in form, having flat front and rear faces. Each of links 4, 5 has a generally triangular profile and is arranged in a common cross-sectional plane in use. The apex of each link has a rounded chamfer. Each of the three sides of each linking portion 4, 5 is curved inwardly or bowed in form. The link has the appearance of two inclined arms that meet at an elbow, thereby forming a triangular element. In use, one arm 15 (i.e. the lower arm or primary mount link portion) of each link extends generally downwardly between the connecting aperture 10, 11 of the mounting formation 3 and the associated bracket 7, 8 of the engine casing. The other arm 16 (i.e. the secondary arm or lever) extends from the connecting aperture 10, 11 generally towards the centre line of the casing. The arms 15, 16 are most clearly seen in FIG. 2. The secondary, or lever, arm 16 of the links 4, 5 is longer and may be narrower than the first arm 15. Each link 4, 5 has three connecting apertures, each comprising through-bores of circular cross-section. One aperture is located in the vicinity of each apex of the triangular link element. There is therefore an aperture in the lower arm, the upper arm and in the vicinity of the central apex.

In use, the first arm 15 of the left hand link 4 is located within the component-receiving groove in the left casing-mounted lug 7. A connecting pin extends through the connecting aperture in the left casing-mounted lug 7 and the connecting aperture in the first arm 15 of the link. The link 4 is thus secured to the lug 7. Furthermore, the aperture in the vicinity of the central apex in the link 4 is located in the component-receiving groove 9 in the mounting formation 3. A connecting pin extends through both the connecting aperture 10 in the left lug of the mounting formation 3 and the central aperture 10 in the link 4, securing the link 4 to the mounting formation 3. Furthermore, the upper arm 16 of the link 4 is located in the groove in the in the mounting formation 3, such that the aperture in the second arm 16 is aligned with the central aperture 12 in the mounting formation 3. A connecting pin extends through the aperture in the second arm 16 and the central aperture 12 in the mounting formation 3 to secure the link to the mounting formation 3.

The central aperture 12 in mounting formation 3 may offer larger clearance of the pin therein such that the pin is more loosely held in the central aperture in normal operation. As such, the engine weight may be substantially borne by the primary arms 15 of the links 4 and 5 in normal use. In the event that either of links 4, 5 should fail, either by way of failure of the links themselves or else the pins or mounting/support formation, then the intermediate link would serve as a catcher link, thereby sharing the load with the remaining link 4 or 5. This arrangement thus provides a fail-safe load path.

In a similar manner to the left hand link 4, the first arm 15 of the right hand link 5 is connected to the right bracket 8 on the casing and the central apex of the right hand link 5 is connected to the aperture 11 in the right lobe of the mounting formation 3. However, the second arm 16 of the right hand link 5 is received within the component-receiving groove in the centre lug 6 on the casing. It is secured thereto by a pin connection through the apertures 25. In this way the aperture 12 towards the end of the second arm in the left hand link is located directly above the aperture 25 towards the end of the second arm in the right hand link.

Figure 5:
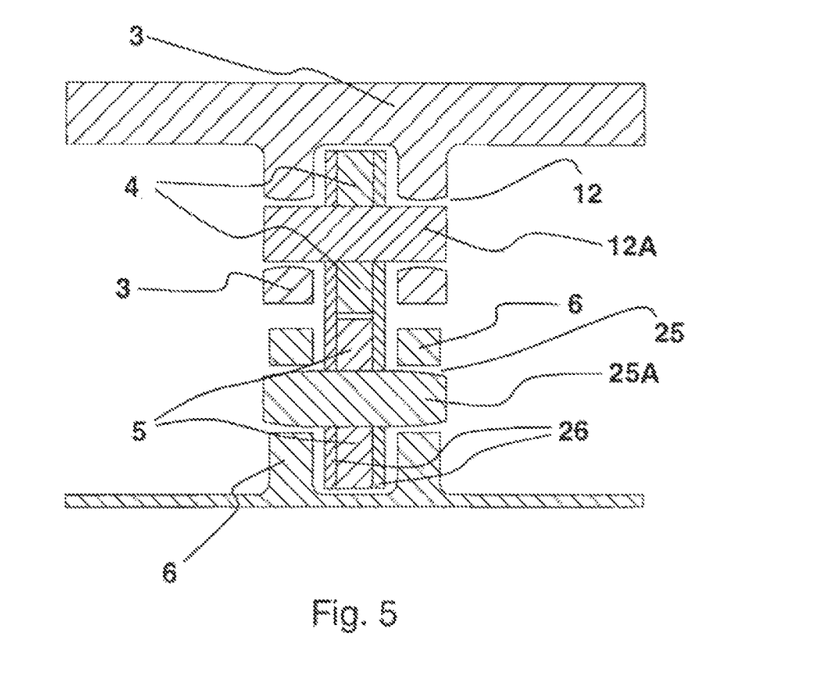
FIG. 5 shows a cross-section through the centreline of the intermediate link assembly of FIG. 2.

A paired intermediate link in the form of connecting couplings 26 connect the ends of the second arms 16 in the left 4 and right 5 hand links. In this regard the intermediate link is provided by a pair of link members located on either side of the left 4 and right 5 link members as shown more clearly in FIG. 5. The connector coupling provides a fail-safe catcher arrangement in the event that one of the links 4 or 5 fails as described above. The coupling 26 comprises two generally rectangular or rounded plates. The corners of the plates are provided with a rounded chamfer such that the coupling 26 may be considered to be elliptical, oval or stadium shaped in plan. Each end of each plate is provided with a circular through-bore, which is a close fit to a pin passing therethrough as shown in FIG. 5.

In use, the lower ends of the couplings 26 are located within the groove in the central lug 6, and are secured thereto by pin connection. The upper ends of the couplings 26 are located in the groove 9 in the mounting formation 3 and are secured thereto by pin connection through the central aperture 12 in the mounting formation. The plates of the coupling 26 are located on either side of the upper ends of the left and right link arms. Thus, the coupling 26 connects the upper ends of the left and right links together while also providing a link between the engine casing and mounting formation 3.

Figure 1:
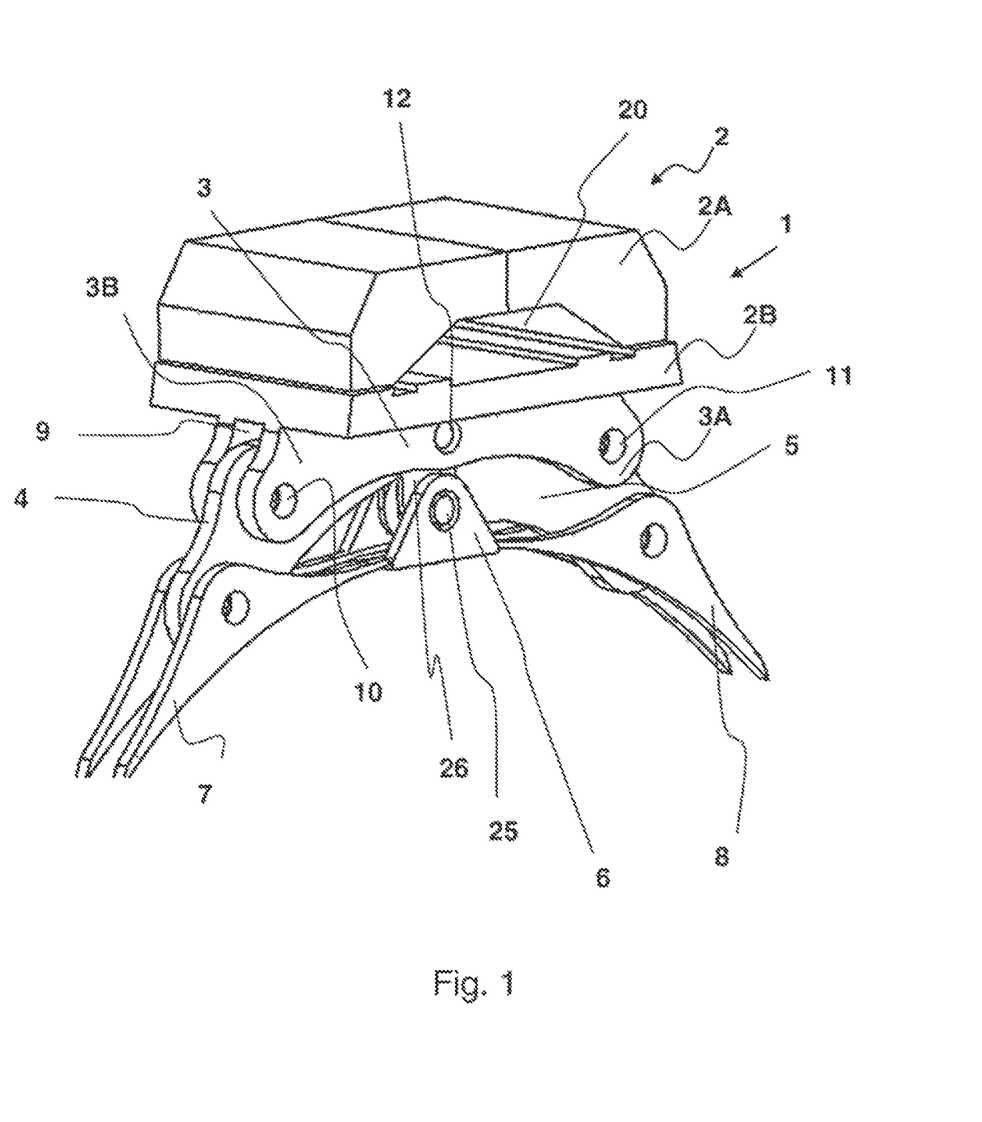
FIG. 1 is a three-dimensional view of an assembly in accordance with an example of the invention.
Figure 2:
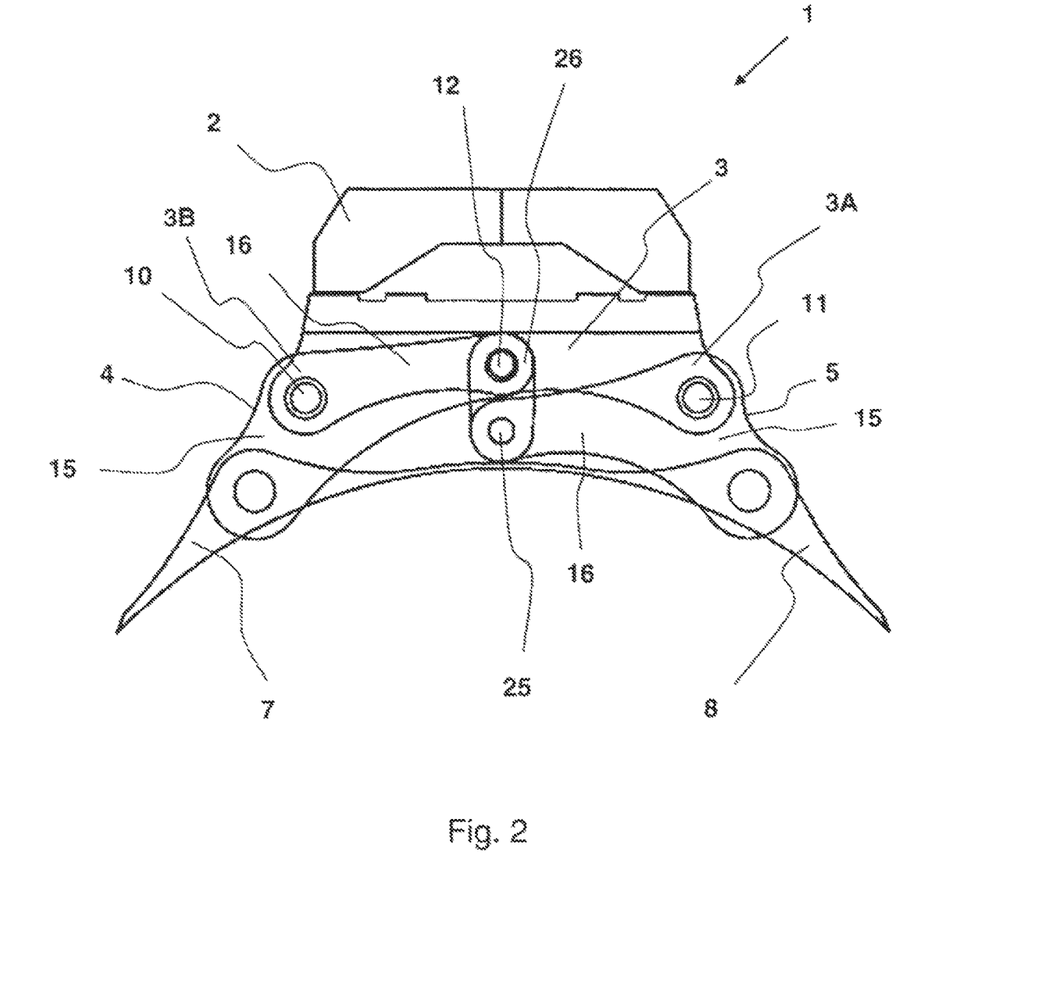
FIG. 2 is a front wireframe view of the assembly of FIG. 1.
Figure 3:
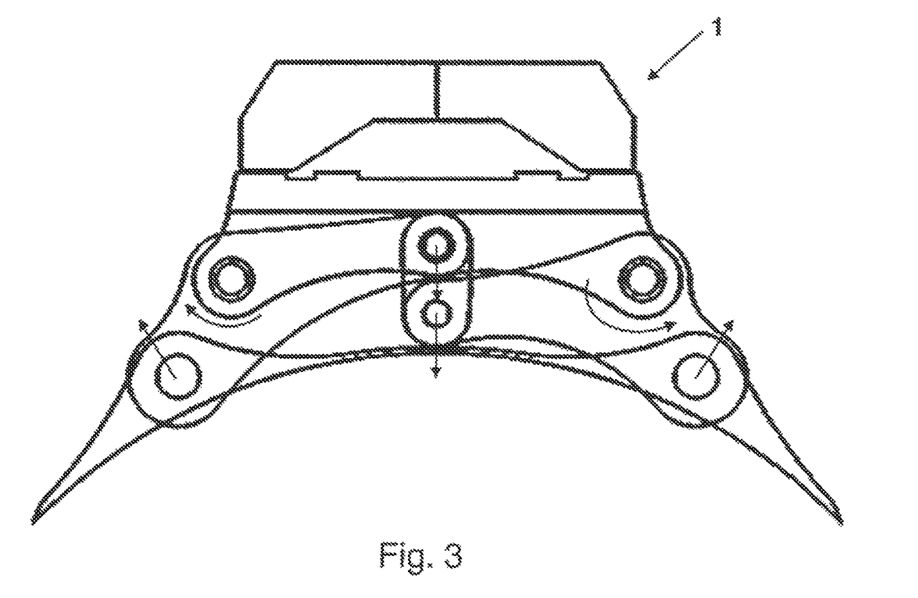
FIG. 3 is the view of FIG. 2, in which directions of radial thermal expansion are shown in one example of use.

In use, an engine casing is subjected to various types of loading, such as lateral, vertical and torsional loads. Furthermore, the engine may experience thermal expansion or contraction. FIG. 3 shows the displacements on the components when thermal expansion occurs in a localised region of the engine such that the lugs 7 and 8 are moved radially outwardly. This displaces the first arm 15 of the left link 4, thereby applying a rotation to the left link 4 about the pin connection 10 in the clockwise sense shown by the arrow. This rotation causes a substantially vertically downwards deflection at the second arm 16 of the left link 5. This in turn causes the second arm 16 of the right link 5 to be urged vertically downwards, thereby applying an anticlockwise rotation about pivotal connection 11, which urges the first arm 15 of the right link to apply a radially-outward deflection on the casing. Thus expansion of the left hand side of the casing matches a corresponding displacement on the right hand side of the casing, thereby reducing, and potentially eliminating, lateral displacement as a result of uniform thermal expansion. The net resultant displacement thus acts in a substantially vertical direction.

Figure 4:
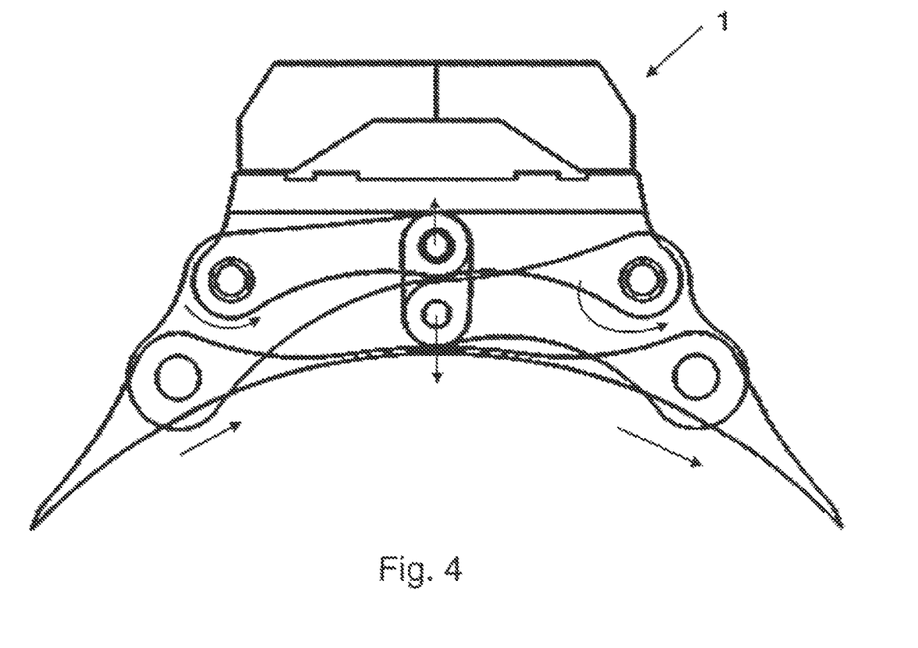
FIG. 4 is the view of FIG. 2, in which directions of forces are shown in another example of use.

FIG. 4 shows the forces on the components when a torsional load is applied to the casing in a clockwise direction. In such a situation, the casing is urged clockwise as shown by the lowermost arrows. This applies a force to the first arm 15 of the left link 4, urging the left link 4 to apply torque about the pin connection at aperture 10 in the sense shown by the arrow. At the same time the right hand casing lug 8 exerts a torque to the right hand link 5 causing it to apply a torque about the upper pin joint at aperture 11 as indicated by the arrow. The inboard end of the upper part of the arm 16 then applies a downwards load as shown by the arrow. As illustrated on the diagram the two inboard ends of the links apply loads in opposing vertical directions creating a tensile load in the central intermediate links 26. The tensile load in the links 26 becomes compressive if the torque is reversed. The torque is therefore balanced in the vertical plane by the arrangement.

The vertical forces in arms 16 at the central pins 12 and 25 give equal and opposite reactions at the pins in apertures 10 and 11, transferring the engine casing torque into the mount pad 3 as symmetric opposing vertical loads. Also the arrangement shares or balances the loads between the two side links, therefore reducing the size relative to a conventional two-link torque capable arrangement.

FIG. 5 shows a cross section through the arrangement in the region of the coupling 26. As is clear from FIG. 5, portions of the left 4 and right 5 links are located between the plates 26 of the coupling, which in turn is received within the grooves defined in the bracket 6 and the mounting formation 3.

In any of the above described embodiments, a pivotal (i.e. pin or ball) connection may be formed between the first and/or second links 4, 5 and the mounting formation. This pivot is thus restrained by the central links 26, typically, but not exclusively, aligned with a centre plane of the engine. Any of the apertures and the corresponding pins may be oriented in a direction substantially parallel with the engine or casing axis 110.

Figure 6:
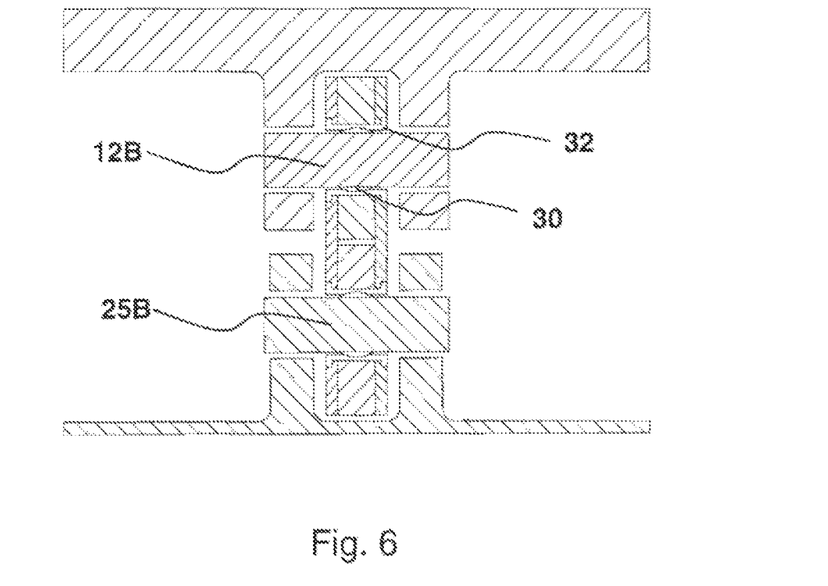
FIG. 6 shows a cross-section through the centreline of an intermediate link assembly according to another example of the invention; and, FIG. 7 shows a gas turbine engine mounted to a pylon in use.

The pins may be simple cylindrical pins throughout the link structure. Alternatively, any of the pin joints, particularly those intended to allow a clearance about the pin through the central link 26, could take the form of the joints shown in FIG. 5 or 6. In the example of the pins within apertures 10, 11 the pins preferably comprise a spherical bearing to allow for pitch or yaw rotation of the link, an example of which is shown in FIG. 6. Other curved pin arrangements could be used to allow for rotational misalignment about pitch and/or yaw axes.

In one example of the central link 26, the pins 25A could be profiled along their length such that they are curved towards their outer ends, e.g. as they pass through the front and rear walls of the bracket/mounting formation. The profile of the pins would typically reduce the diameter of the pin towards its end(s). This is shown by the example of the lower pin in FIG. 5.

An alternative example is shown in the upper pin arrangement of FIG. 5, in which a cylindrical pin 12A of constant diameter along its length is used. In this example, the corresponding aperture 12 is provided with a curved profile at its inner edge. The curved contact interface between the pin 12A, 25A and corresponding aperture 12 or 25 in either the upper or lower pin arrangements shown in FIG. 5 thus helps to reduce peak pin contact stresses during load transfer in the event of failure of one of the primary links, resulting in the catcher pin engagement when the pin is at a pitching angle relative to the clearance aperture due to engine thermal growth causing axial misalignment of the engine mounting formation 3 and casing lug 6. In this regard, the clearance of apertures 12, 25 about pins 12A, 25A is shown in a normal mode of operation, rather than in a link failure operation mode.

In FIG. 6, a further alternative pivoting connection is shown in which the pin 12B has a rounded, typically spherical, protrusion 30 at its centre, i.e. akin to a spherical bearing. The link aperture may be provided with a correspondingly curved or profiled contact portion 32 to accommodate the protrusion 30. The link pin clearance aperture would typically be cylindrical. Thus the joint with the link 4 or 5 may be akin to a ball joint. The catcher pin 12B would have sufficient clearance for normal operation, but in the event of failure of a primary structural element resulting in engagement of the catcher pin, the spherical joint 30 would allow the pin to articulate to minimise contact stresses between the catcher pin and engine casing lugs or the mount pad lugs.

Further alternatives could be catcher pins 12B, 25B, but fixed to mounting formation lugs 3 and/or engine casing lugs 6 and passing through clearance holes in spherical bearings 30 for the central intermediate link.

The above embodiments disclose links 4 and 5 which take the form of elbows such that the outer portion of each link extends in a direction which is generally tangential to the curved profile of the engine casing. Thus the links are shaped to define an open elbow, i.e. having an obtuse internal angle. However in alternative embodiments, it is possible that the links could define an elbow having an acute internal angle. In such examples, the outer portion of the connecting links could be approximately radial to the engine axis and/or casing. In such examples, the link loads could be transferred directly over a structural hardpoint such as an internal casing vane or strut of the engine. In one example, the outer link portion could be substantially aligned with such a structural hardpoint (e.g. in a radial direction). Such a link arrangement would also have the benefit of being able to re-focus the instantaneous swing centre towards the engine centre line or centre of gravity.

In addition to the primary aim of the invention described above in relation to FIGS. 3 and 4, a further function of the mount arrangement is to provide an alternative load path in the event of failure of one of the primary structural elements. In particular it can be seen in the attached figures that the supporting pins provide catcher pins for the central paired intermediate link that can be used as a means of transferring load in the event of failure of either of link elements 4 or 5 or the respective support/mounting formation. In this regard, the catcher pin arrangement would normally have sufficient clearance provided to cater for normal thermal and mechanical deflections and assembly build tolerances. However under failure case scenarios the intermediate pins and clearance holes would provide a secondary load path via the intermediate link to adequately support the engine casing. In other examples, it will be appreciated by the skilled person that other clearance arrangements or alternative means may be provided to maintain the intermediate pin out of the engine weight-bearing load path in normal use, whilst allowing it to selectively become engaged in a load bearing capacity between the engine casing and mount pad.

According to aspects of the invention, it can be seen that an offset between the first and second links of the engine mounting assembly can be provided in order to allow transfer of load between the engine support formations and the aircraft mounting formations in vertical, lateral and roll directions, whilst allowing free thermal expansion axially and radially but avoiding displacement of the engine laterally.

The invention claimed is:

1. An engine mounting assembly, for securing an aircraft engine to an aircraft, the assembly comprising:
   first and second spaced support formations on an engine support structure of the engine;
   first and second corresponding mounting formations on a mounting structure of the aircraft; and
   first and second links, the first link extending between the first support formation and the first mounting formation, and the second link extending between the second support formation and the second mounting formation, the first link having a first connection formation and the second link having a second connection formation, the first and second connection formations being shaped to depend towards a region between the first and second mounting formations,
   wherein the first and second connection formations are offset, spaced from the engine by different distances along a direction perpendicular to a rotation axis of the engine, and connected by an intermediate link, wherein the second link is connected to a first part of the intermediate link, and the mounting structure of the aircraft is connected to a second part of the intermediate link.

2. The engine mounting assembly according to claim 1, wherein the connection formations are aligned with a central plane of the engine.

3. The engine mounting assembly according to claim 1, wherein the first connection formation comprises a first arm and the second connection formation comprises a second arm, wherein the first arm extends beneath the second arm or vice versa.

4. The engine mounting assembly according to claim 1, wherein the first and second mounting formations are located to each side of a primary axis or central plane of the engine and substantially equally spaced therefrom.

5. The engine mounting assembly according to claim 1, wherein the first and second links each have a mounting formation connector and a support formation connector, each of the first and second links extending in a first direction between the support connector and the mounting connector and in a second direction between the mounting connector and the connection formation.

6. The engine mounting assembly according to claim 5, wherein the distance between the mounting connector and the connection formation for the first and/or second link is greater than the distance between the support connector and the mounting connector.

7. The engine mounting assembly according to claim 5, wherein the first direction is angularly offset from a central plane of the engine by between 15° and 35°.

8. The engine mounting assembly according to claim 1, wherein the first and second links each comprise a rigid elbow formation.

9. The engine mounting assembly according to claim 1, wherein the first and/or second links are attached to any or any combination of the support formations, mounting formations and/or intermediate link by a pin.

10. The engine mounting assembly according to claim 9, wherein the first and/or second links are attached to the intermediate link by a pin joint having one or more profiled surface so as to be tolerant to a rotational misalignment about an axis that is offset from a primary engine axis.

11. The engine mounting assembly according to claim 1, wherein the intermediate link provides a failsafe catcher link arranged to be selectively engaged in the force path between (i) the mounting structure of the aircraft and (ii), the engine support structure so as to bear at least a component of the engine weight in the event that the first or second link fails.

12. The engine mounting assembly according to claim 1, wherein the intermediate link extends between (i) the mounting structure of the aircraft and (ii) the engine support structure.

13. The engine mounting assembly according to claim 1, wherein an intermediate mounting formation is provided between the first and second mounting formations and an intermediate support formation is provided between the first and second support formations, the intermediate link being attached between the intermediate mounting and support formations.

14. The engine mounting assembly according to claim 13 wherein the connection formations of the first and second links are connected to a respective one of the intermediate mounting and support formations.

15. The engine mounting assembly according to claim 13, wherein the intermediate support and/or mounting formation is attached to the intermediate link by a pin, wherein said intermediate support and/or mounting formation comprises an oversized aperture for receiving the pin so as to provide a clearance about the pin.

16. The engine mounting assembly according to claim 1, wherein the intermediate link is angled relative to an adjacent portion of the first and second links by an angle of greater than 45°.

17. The engine mounting assembly according to claim 1, wherein the mounting structure of the aircraft comprises a pylon and the engine support structure comprises an engine casing.

18. A link assembly for mounting an aircraft engine to an aircraft, the link assembly comprising:
 a first link having a first support formation connector for attachment to a first support formation on the engine and a first mounting formation connector for attachment to a first mounting formation on the aircraft;
 a second link having a second support formation connector for attachment to a second support formation on the engine and a second mounting formation connector for attachment to a second mounting formation on the aircraft;
 each of said links having a connection formation spaced from the support formation and mounting formation connectors, said links being shaped such that, when connected to the respective first and second support and mounting formations the connection formations are of and spaced from the engine by different distances along a direction perpendicular to a rotation axis of the engine,
 wherein the assembly further comprises an intermediate link arranged to be connected between the connection formations of the first and second links.

* * * * *